Figure 1:
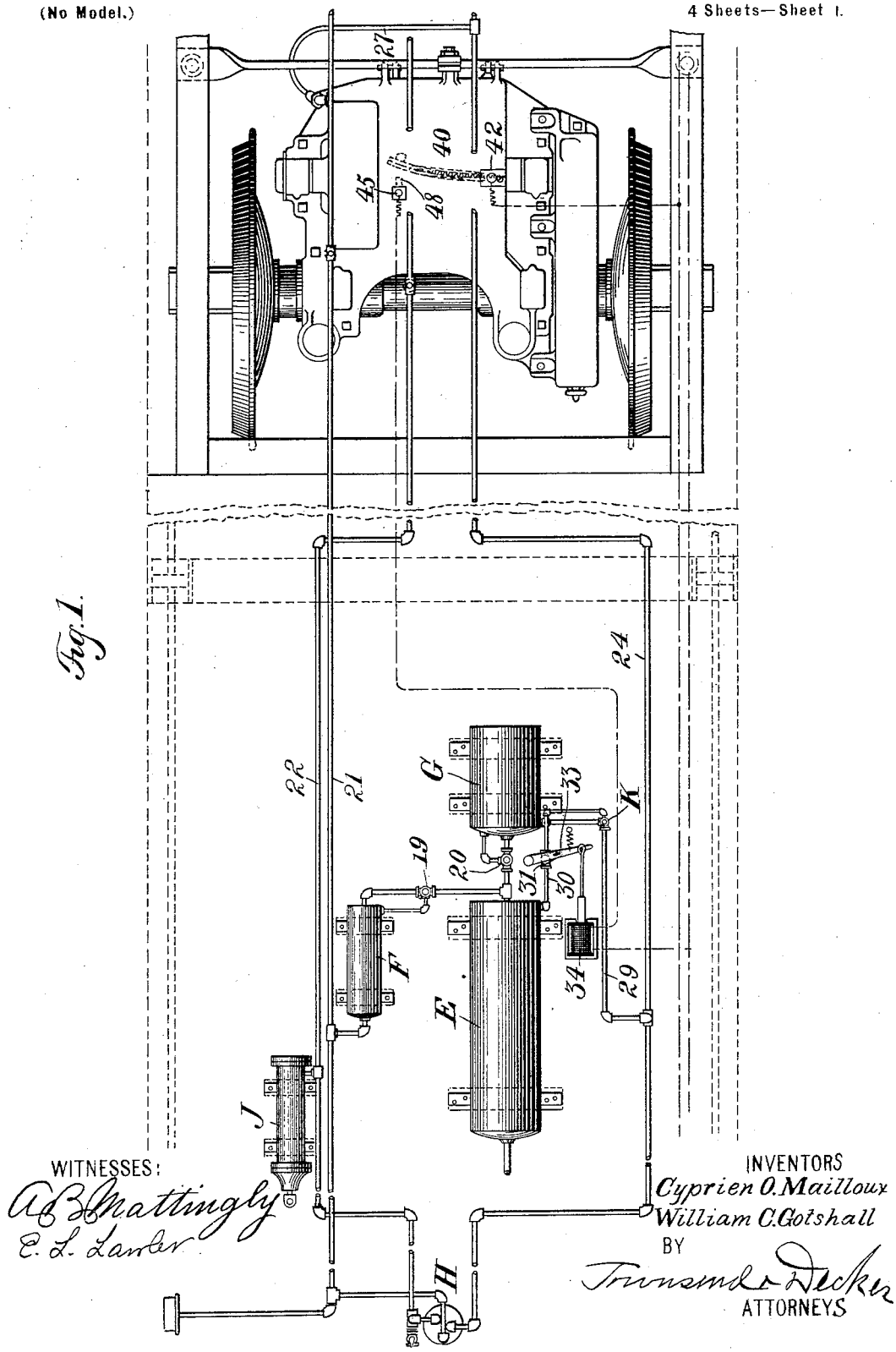

No. 714,498. Patented Nov. 25, 1902.
C. O. MAILLOUX & W. C. GOTSHALL.
RAILWAY ELECTRIC MOTOR COOLING SYSTEM.
(Application filed Sept. 13, 1902.)

(No Model.) 4 Sheets—Sheet 1.

WITNESSES:
A. B. Mattingly
E. L. Lawler

INVENTORS
Cyprien O. Mailloux
William C. Gotshall
BY
Townsend Decker
ATTORNEYS

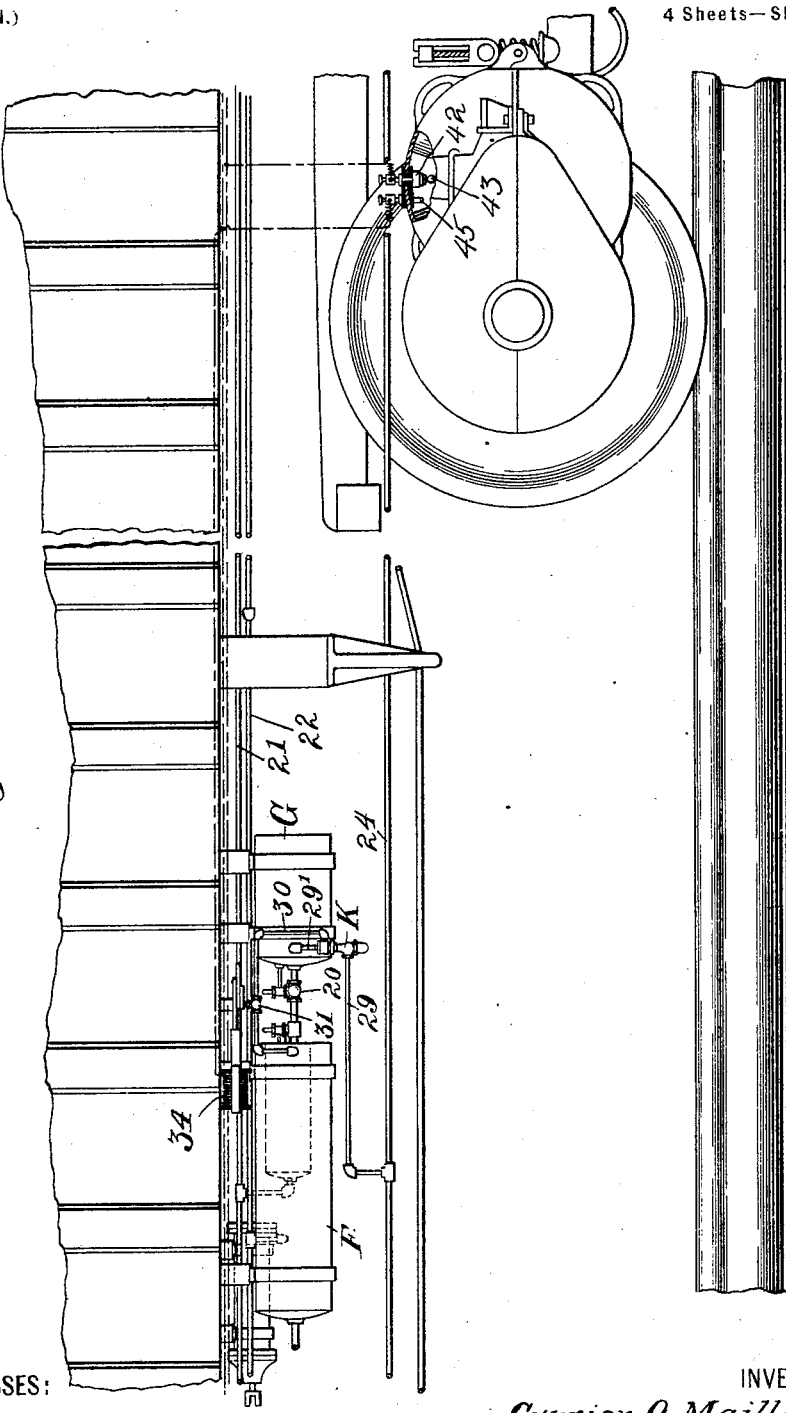

No. 714,498. Patented Nov. 25, 1902.
C. O. MAILLOUX & W. C. GOTSHALL.
RAILWAY ELECTRIC MOTOR COOLING SYSTEM.
(Application filed Sept. 13, 1902.)
(No Model.) 4 Sheets—Sheet 3.
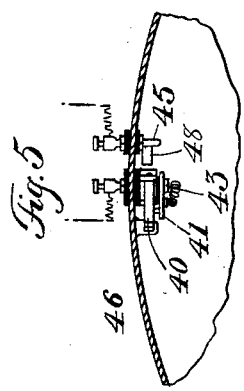
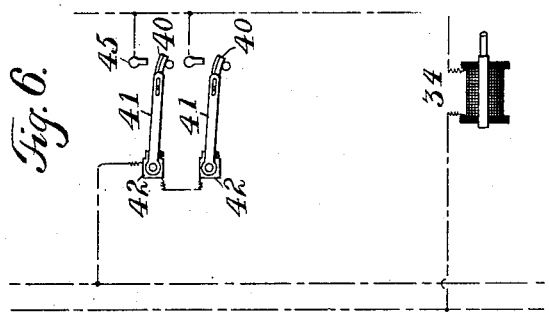
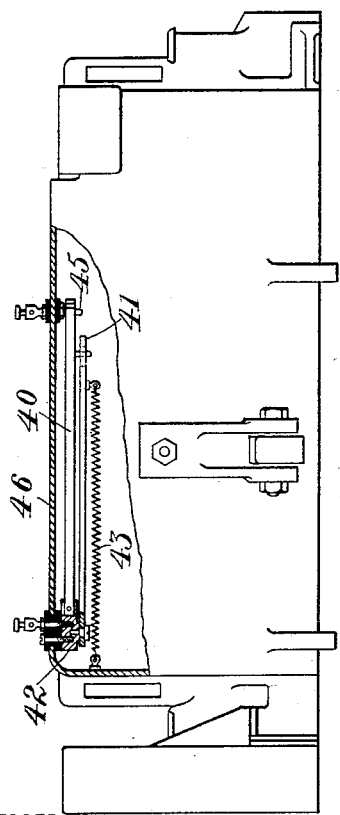
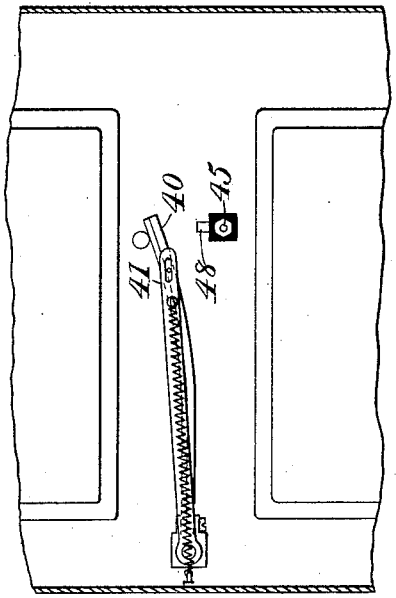
WITNESSES:
AB Mattingly
E. L. Lawler
INVENTORS
Cyprien O. Mailloux
William C. Gotshall
BY
Townsend & Decker
ATTORNEYS No. 714,498. Patented Nov. 25, 1902.
C. O. MAILLOUX & W. C. GOTSHALL.
RAILWAY ELECTRIC MOTOR COOLING SYSTEM.
(Application filed Sept. 13, 1902.)
(No Model.) 4 Sheets—Sheet 4.
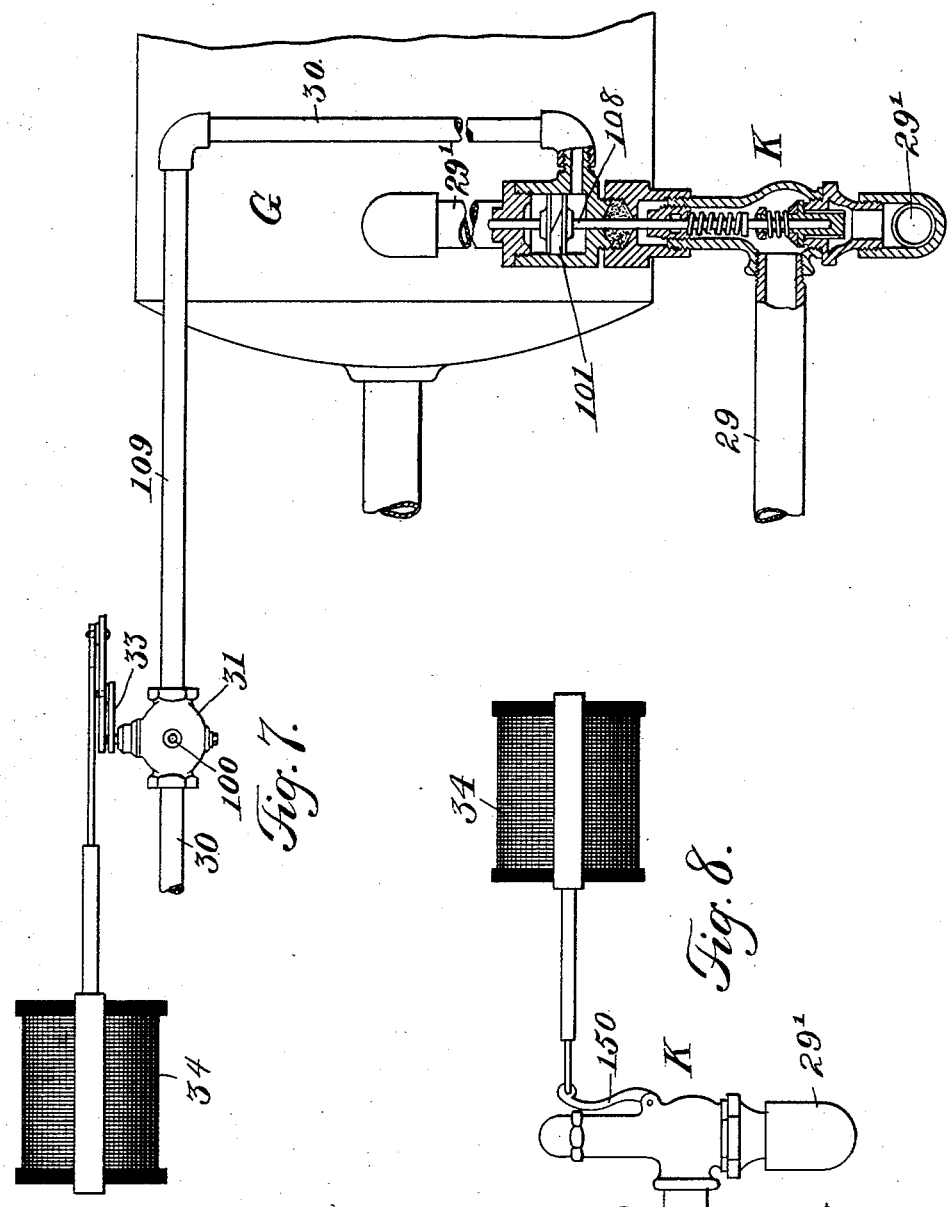
WITNESSES:
A. B. Mattingly
E. L. Lawler
INVENTORS
Cyprien O. Mailloux
William C. Gotshall
BY
Townsend & Decker
ATTORNEYS

UNITED STATES PATENT OFFICE.

CYPRIEN O. MAILLOUX AND WILLIAM C. GOTSHALL, OF NEW YORK, N. Y.

RAILWAY ELECTRIC-MOTOR-COOLING SYSTEM.

SPECIFICATION forming part of Letters Patent No. 714,498, dated November 25, 1902.

Application filed September 13, 1902. Serial No. 123,226. (No model.)

*To all whom it may concern:*

Be it known that we, CYPRIEN O. MAILLOUX and WILLIAM C. GOTSHALL, citizens of the United States, and residents of New York, in the county of New York and State of New York, have invented a certain new and useful Railway Electric-Motor-Cooling System, of which the following is a specification.

Our invention relates to apparatus for cooling the electromotors upon the car or cars of an electric railway, and is designed to provide an improved means whereby the said motors may be kept cool by the application of a suitable cooling agent the application of which to the motor is automatically controlled by temperature conditions in the motor itself.

Our invention is particularly useful for the motors of electric railways wherein the speeds are high and the stops frequent, so that a short-time schedule cannot be obtained without a high rate of acceleration in starting the car or train of cars after each stop. In such systems the motors are exposed to great heating, and, as will be obvious, the heating will depend to a large extent upon the size of the loads being carried on the car or train of cars.

Our invention provides a means whereby the extent to which the cooling agent is used is made automatically dependent upon the requirements of the motor.

To this end our invention consists in the combination, with the motor and means for cooling the same, of devices responsive to changes of temperature in the motor and adapted through suitable mechanism or devices to control the application of the cooling agent. When the temperature in the motor rises beyond a certain adjusted degree, the cooling agent is automatically applied, and when the temperature falls the application of the cooling agent is automatically caused to cease. The device responsive to changes of temperature is preferably a thermostat, and preferably the control of the cooling agent is effected by means of an electric circuit closed and opened by said thermostat. Preferably the cooling agent is air or other gas under pressure permitted to expand and conducted through suitable pipes into or upon the motor.

The invention is also useful in those systems wherein the motor is used as a brake by turning it into a generator, in which case the motor is subjected to additional heating over and above that acquired during acceleration after stops.

Our invention may be used with or without the arrangement of apparatus described in our application filed August 26, 1902, Serial No. 121,077, wherein we have described the use of the exhaust-air for an air-brake system as a means for cooling the motor by heat-dissipating effects of expanded air conducted into or upon the motor.

Our invention consists also in combinations of apparatus, as more particularly hereinafter described and then specified in the claims.

In the accompanying drawings, Figure 1 is a general plan of apparatus embodying our invention. Fig. 2 is a side elevation of the same apparatus. Fig. 3 shows the motor-casing broken away to illustrate one way of mounting the thermostat. Fig. 4 is a plan of the thermostat, showing the preferred location thereof in the space between the field-magnets of the motor. Fig. 5 is a vertical section through the upper part of Fig. 3 and shows the thermostat in end view. Fig. 6 is a diagram illustrating the use of a multiplicity of thermostats mounted, respectively, in the same motor. Fig. 7 is an enlarged detailed view of a preferred arrangement of devices for causing the valve to open the passage from a source of air or gas under pressure and shows the valve itself in vertical section. Fig. 8 illustrates a modification in the manner of operating the valve by the agency of electromagnet.

Referring to Figs. 1 and 2, the cooling agent is supposed to be compressed air contained in a suitable tank G, having an outlet-pipe in which is located a valve controlling the passage of air to the electric motor and in turn controlled by the thermostat in or on the motor. When the tank G discharges, it requires a charge from a storage-tank E or other suitable source providing air under higher pressure than that designed to be carried in tank G, which latter is connected with E, in the present case through a suitable pressure-reducing valve 20. Tank E may be supplied from any source—as, for instance, from a motor-driven compressor on the car operated and controlled in the manner usual in a well-known air-brake apparatus, or it may be charged from any other source.

F indicates the tank for the air-brake, and 19 a pressure-reducing valve adjusted as may be desired and located between tanks E and F.

J is the brake-cylinder, and H shows the usual brake-control valve connected, on one hand, with pipe 21, leading from tank F, and, on the other hand, with pipe 22, leading to the brake-cylinder. When employed according to our invention, the exhaust-port of the valve connects with a pipe 24, joined by a flexible or other branch pipe 27 with the motor and opening into the casing thereof or into any system of air-distributing pipes disposed within the motor-casing, as described in our application before referred to.

Air from tank G passes to the motor through pipe 24 or by other means, and the discharge of the air from said tank is controlled by a suitable valve K, located in the connection from tank G to pipe 24, as shown. In the drawings the pipes 21, 22, and 24 are those for a single car. As will be readily understood by those skilled in the art, these pipes 21, 22, and 24, running through the car from end to end thereof, would for train service preferably be provided with the usual air-brake couplings, so that the exhaust of valve H at either end of the car and the discharge of air through any valve K on any car of the train would feed all the air-brake cylinders J on the train and all the branch connections 27, leading to the motors of the various cars in the train in multiple, while the brake-cylinders J upon all cars of the train would be similarly fed in multiple in pipe 22 when any valve H is operated to apply the brakes.

The valve K may be of any desired form or construction and may be actuated or controlled by the thermostat in any desired manner. Valve K may, for instance, be of the form known in steam engineering as a "sniffing" or "pop" valve, such as used for releasing excessive pressure. This valve may be located in the connection 29' 29, leading from tank G and as more particularly shown in Fig. 7. Preferably we operate it by means of a power released through the action of the thermostat 40, located within the motor-casing in any desired manner and acting by preference through the intervention of electromagnet 34. The power so released may be air-pressure derived from tank E through a pipe 30, having a valve 31, whose lever is suitably connected with a lever 33, which is operated by connection with movable core or armature of electromagnet 34. Valve K should have large ports, so as to discharge freely, and valve 31 should have restricted carrying capacity, the purpose being to use the air admitted through 30 only to set off the valve K, which thereupon discharges the air and reduces the pressure of G, so to require fresh supply through valve 20.

Valve K, as shown in Fig. 7 in vertical section, is of the well-known form, as shown, but has its stem 108 extended through its top to connect with the piston 101, working in a cylinder fastened to the top of valve K and connected with valve 31 by pipe 109, through which the pressure is admitted beneath piston 101 to lift the piston and open the valve K.

Valve 31 should be of the usual type adapted to permit the pressure in pipe 109 to exhaust through a port 100 when the valve 31 closes to shut off the pressure.

Instead of using air-power to actuate the valve K it may be actuated directly by electric power brought into play by the thermostat. Thus, for instance, as indicated in Fig. 8, the movable core of the magnet 34 may be connected directly with the drop-lever 150 of the usual form employed with pop-valves to permit the valve to be opened manually.

Electromagnet 34 may be operated by a current taken in multiple from any supply mains or wires on the car charged with energy from any source and connected across said mains in series with the thermostat 40 or with a number of said thermostats in multiple with one another, as indicated in Fig. 6. The thermostat may be of any desired construction and provided with electric contacts to permit said thermostat to open and close an electric circuit after the manner employed in thermostatic electric-control apparatus. The thermostat shown comprises a compound bar adapted to flex with changes of temperature and having the block to which it is fastened at one end secured on the inside of the motor-casing 46, as shown in Fig. 3. A block of insulation is used to insulate the bar, preferably from the casing, and a conducting-post passes through said block into the metallic support for the end of bar 40, which bar itself is also made of metal in whole or in part, so that it may close and break circuit upon a contact stud or post 45, also secured in the motor-casing. The circuit for the magnet 34 is through said bar and post 45. To secure positive make and break of circuit when the temperature of the bar by heating from the motor passes the desired limit and tends to flex or passes a certain point in its movement or flexure, we prefer to use any suitable snap-action device—such as, for instance, a freely-pivoted lever 41, having a slot engaged by a pin on bar 40, as shown. A tension-spring 43 throws the lever and connected bar 40 by a positive movement as soon as through the flexure of the bar 40 said lever 41 passes the dead-center. To secure the best action, the post 45 should be provided with a contact extension 48, with which the bar 40 may make sliding or wiping contact. This contact 48 extends sufficiently to prolong the contact with the bar 40 until the lever 41 has passed the middle position or dead-center, whereupon the spring 43 will act to move the bar 40 quickly away from contact with the extension 48. The thermostat may be located in position in the motor where it will be best exposed to heat developed in said motor.

In practice it will be desirable to use a number of thermostats disposed in different positions through or about the motor, so as to insure the operation of the valve which controls the application of the cooling agent when the motor becomes heated in any part to such degree as to make it desirable to reduce its temperature or to keep the temperature down. The diagram Fig. 6 shows the manner in which the two or more thermostats thus employed would be connected up to the circuit of the electromagnet 34, as shown. Said thermostats are connected in multiple with one another, but in series with the magnet. In the operation of the apparatus the tank G is charged through the reducing-valve and holds a charge ready to discharge by valve K. Tank G retains its charge until the motor becomes heated to such extent as to cause the thermostat to be thrown from its dead contact to its live contact in any part of the motor. The magnet 34 is then energized and pressure is applied to valve K, causing the same to open and discharge the tank G in obvious manner. The reduction of temperature thus produced in the motor causes the thermostat to reverse and open the circuit of the electromagnet 34, and, the valve K having in the meantime resumed its seat by reduction of pressure behind it, the tank G reaccumulates pressure through the reducing-valve ready for the next operation.

We do not limit ourselves to the use of any particular cooling agent or to any particular way of causing the same to act in or upon the motor. As will be obvious, the invention admits of many variations in respect to the cooling device or means, the thermostatic device, the manner of controlling the one by the other, and other details.

While we have shown and described a control of the valve K from the thermostat by the intervention of an electric circuit and an intermediate power in the shape of air-pressure controlled by a magnet, we by no means limit ourselves to this manner of bringing the valve into action. Any means or mechanism whereby the valve may be caused to open when the thermostat acts will answer the purposes of our invention.

What we claim as our invention is—

1. The combination with an electric-car motor, of means for cooling the same, and means responsive to changes of temperature condition in the motor for controlling the action of the cooling means.

2. The combination with an electric-car motor, of a source of compressed air, a pipe for conveying the air from said source to the motor, a valve in said pipe, and a thermostat controlling the action of said valve and itself subject to changes of temperature condition in the motor.

3. The combination with the electric motor for a railway-car, of a cooling agent, a valve in a passage between the tank or receptacle containing said cooling agent and the motor, and a thermostat mounted in the motor and controlling the action of said valve.

4. The combination with an electric motor for a railway-car, of a source of compressed air, connections from the same to the motor, a discharge-valve, a thermostat responsive to changes of heat condition in the motor, an electromagnet in a circuit controlled by said thermostat, and a valve operated by said magnet and controlling the application of a pressure adapted to bring the first-named valve into action.

5. The combination with an electric motor, of a cooling agent, two or more thermostats disposed in or about the motor as described, and means subject alike to the control of said thermostats for governing the application of the cooling agent as and for the purpose described.

6. The combination with an electric motor and a source of compressed air connected with the motor, of a valve, and electromagnet controlling the same, and two or more thermostats placed in series with said electromagnet on the circuit therefor, but in multiple relation to one another, as and for the purpose described.

Signed at New York, in the county of New York and State of New York, this 9th day of August, A. D. 1902.

CYPRIEN O. MAILLOUX.
WILLIAM C. GOTSHALL.

Witnesses:
WALTER L. BUNNELL,
E. L. LAWLER.